United States Patent [19]

Prus

[11] 4,383,964
[45] May 17, 1983

[54] PROCESS AND MACHINE FOR OVER-MOLDING CONNECTORS ON ELECTRICAL CONDUCTORS

[76] Inventor: Henryk Prus, 2, square François Couperin, Antony, France

[21] Appl. No.: 247,276

[22] Filed: Mar. 25, 1981

[30] Foreign Application Priority Data

Mar. 31, 1980 [FR] France ............................ 80 07185

[51] Int. Cl.³ ........................ B29D 3/00; B29C 1/00
[52] U.S. Cl. ................................ 264/237; 264/263;
264/274; 264/275; 264/328.16; 264/336;
425/125; 425/126 R; 425/129 R; 425/145;
425/161; 425/395; 425/404; 425/468; 425/522;
425/DIG. 201
[58] Field of Search ............... 264/237, 263, 272.11,
264/336, 28, 328.14, 328.16, 274, 275; 425/126
R, DIG. 201, 125, 145, 161, 129 R, 395, 404,
468, 522; 29/858

[56] References Cited

U.S. PATENT DOCUMENTS

| | | | |
|---|---|---|---|
| 3,009,197 | 11/1961 | Hahn | 29/858 |
| 3,182,280 | 5/1965 | Daut et al. | 339/66 |
| 3,419,297 | 12/1968 | Diepenhorst et al. | 264/249 |
| 3,963,822 | 6/1976 | Beck et al. | 264/263 |
| 4,187,272 | 2/1980 | Bourdon et al. | 264/318 |
| 4,205,950 | 6/1980 | Suss et al. | 264/237 |

FOREIGN PATENT DOCUMENTS

| | | | |
|---|---|---|---|
| 752286 | 2/1967 | Canada | 264/28 |
| 2058041 | 9/1971 | Fed. Rep. of Germany | 425/DIG. 201 |

Primary Examiner—James B. Lowe
Attorney, Agent, or Firm—Kirschstein, Kirschstein, Ottinger & Cobrin

[57] ABSTRACT

For over-molding a thermo-plastic material on a connector, the connector is, at the outlet of the machine having crimped the connector on a conductor, carried into a gripper maintaining the connector when introducting a core mounted on a conveyor. The connector is then carried into an injection mold from which it is extracted before complete cooling, to be carried to a cooling station comprising a mold similar to that of the injection mold but being at a lower temperature.

9 Claims, 3 Drawing Figures

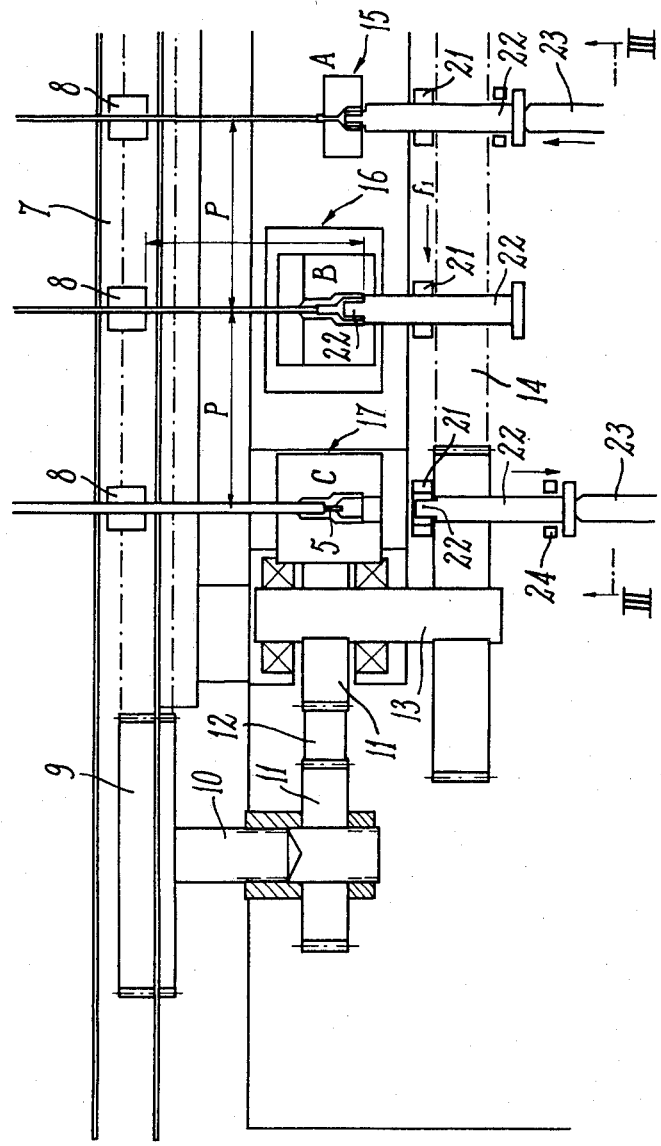
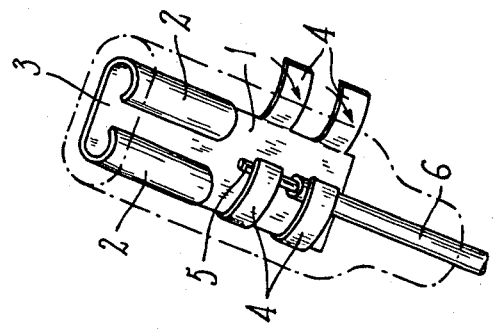

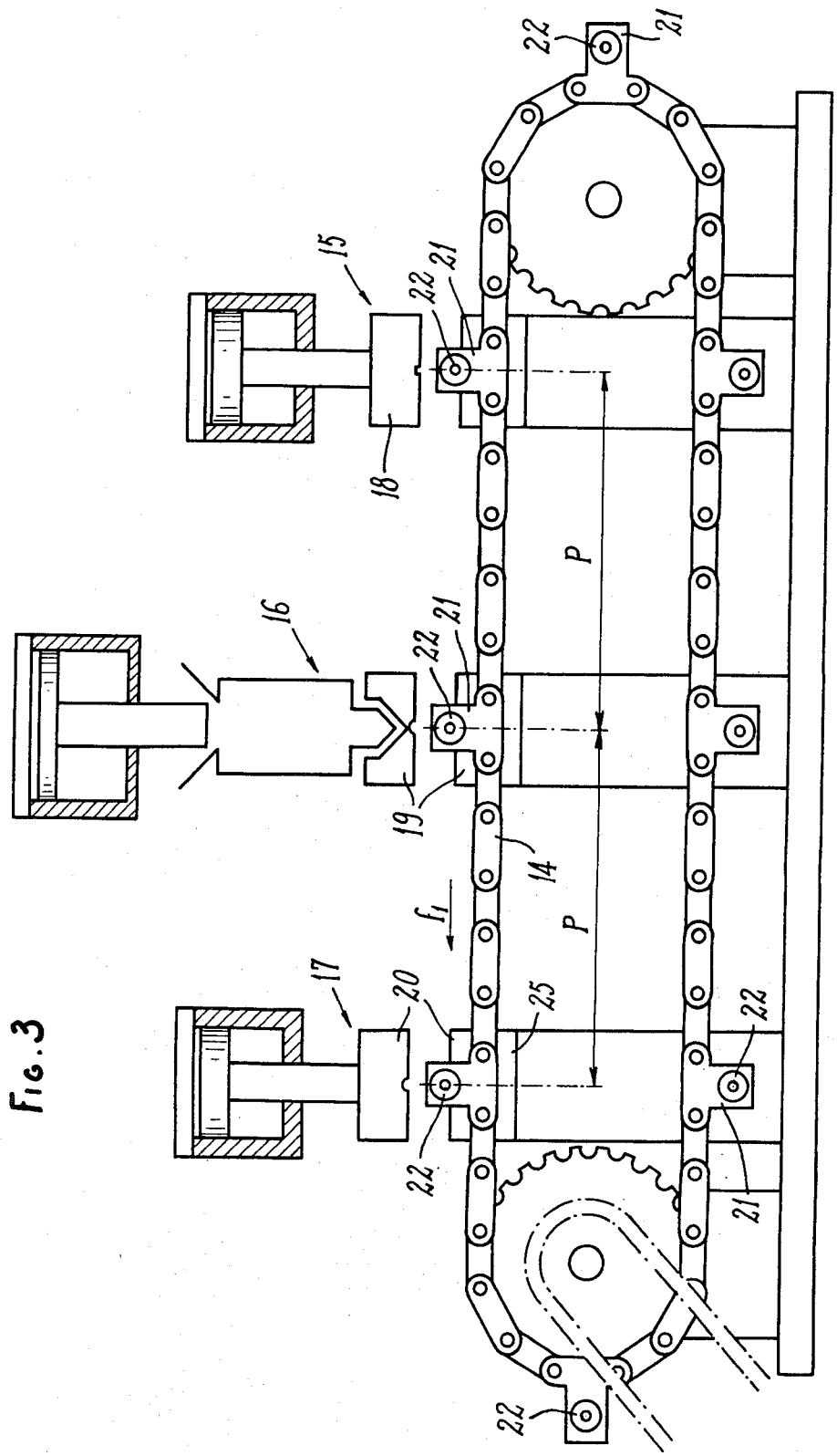

PROCESS AND MACHINE FOR OVER-MOLDING CONNECTORS ON ELECTRICAL CONDUCTORS

BACKGROUND OF THE INVENTION

The various electrical equipments of machines or vehicles comprise conductor bundles (harnesses) for connecting various apparatus together. The conductors of such bundles, before forming the bundles, have to receive at their tip ends male or female connectors with one or several pins or sockets. Then, the connectors have to be insulated, said insulation being provided advantageously by an over-molding made of a thermoplastic material.

In the present state of the art, the connectors are crimped on the stripped end of the conductors before being over-molded, this crimping operation being carried out at a very quick rate in machines designed to this effect which are used on a large scale.

The conductors provided with their connectors have then to be brought to over-molding machines which inject the plastics material over the portions of the connectors which have to be insulated.

In an injection machine, the thermoplastic material introduced in the mold has to remain normally in said mold until complete solidification. The duration of this solidification is substantially longer than the duration of the crimping operation. This is the reason why it was not hitherto possible to reduce the duration of the working cycle of the over-molding machine and to synchronize it with the working cycle of the crimping machine without considerably slowing down the operatively working frequency of the latter.

The present invention provides a solution to the above mentioned problem and combines the crimping machines with a new over-molding machine for the connectors carrying a new process into effect.

SUMMARY OF THE INVENTION

According to a first aspect of the invention, the process for over-molding connectors with a thermoplastic material, said connectors being previously positioned on tip ends of electrical conductors, wherein said over-molding is carried out in an injection press having a mold in which is introduced the connector connected to its conductor to produce an over-molded connector, is characterized in that the over-molded connector is extracted before complete cooling of the thermoplastic material and in that the over-molded connector is carried into a mold of a second press, said mold maintained at a temperature being lower than that of the mold of the injection press and below that for which it would be possible to introduce the thermoplastic material, and transferring the over-molded connector from the mold of the injection press to the mold of the second press sufficiently rapidly for preventing a deformation of the thermoplastic material which is still not solidified.

According to a second aspect of the invention and for carrying out the hereabove process, the invention provides a machine for the over-molding of a thermoplastic material on connectors crimped on the stripped ends of conductors, characterized in that a conveyor extending from the crimping machine carries the connectors to a first station where a core is positioned at portions of the connector which have to be kept protected from an over-molding, and carries then the connectors to a second station comprising an injection press, the injection press having tools which are maintained at a suitable temperature facilitating introduction therein of an overmolding material, and to a third station comprising a press provided with molding tools similar to that of the injection press, but maintained at a low temperature, said low temperature being lower than that for which an injection of a thermoplastic material would be possible.

Various other features of the invention will become more apparent from the following detailed description.

BRIEF DESCRIPTION OF THE DRAWINGS

Embodiments of the invention are shown, by way of non limitative examples, in the following drawings wherein:

FIG. 1 is a partly diagrammatic perspective view of a connector in the shape of a terminal lug to be over-molded by the machine of the invention;

FIG. 2 is a partial diagrammatic plan view seen from above, of the main portion of the over-molding machine;

FIG. 3 is a partial diagrammatic elevation view of the over-molding machine, as seen substantially along line III—III of FIG. 2.

DESCRIPTION OF A PREFERRED EMBODIMENT

FIG. 1 shows a connector chosen amongst simple connectors in the shape of a terminal lug, which are used in many fields of the technique, particularly in the automobile industry.

As is well known, the connector of FIG. 1 comprises a metallic plate 1 from which are rolled two clamps 2 defining a channel which has to be threaded onto a male connector (not shown). The plate 1 forms also lugs 4 which are to be crimped on the stripped portion of a conductor 5 having an insulating sleeve 6.

The hereabove described connectors, or other connectors, are crimped on a machine (not shown) to which the plates 1 are fed in a manner known per se, as well as the conductors 5 previously cut to a desired length. The machine comprises a conveyor 7 provided with clamps 8 maintaining the conductors 5 via their sleeves 6 at a distance from the stripped end of the conductors 5.

In the embodiment shown in FIG. 2, the conveyor 7 is for instance of the chain type and it comprises a sprocket wheel 9 used for driving through a shaft 10 a toothed wheel 11 which, in turn, is used for driving a second chain 12 the second wheel 11 of which drives, through a second shaft 13, a second conveyor 14. The various transmission members between the conveyors are not shown in detail since they are known in the art and they are not directly a part of the invention, the essential point being that the two conveyors move in synchronism by a step by step movement of a pitch p.

It is said hereabove that the conveyors are of the chain type, but they could also be of the band or track type, or of any other desired type.

The second conveyor 14 which progresses as conveyor 7 in the direction of arrow $f_1$ moves past three successive presses 15, 16 and 17.

The press 15 comprises, as shown in FIG. 3, a tool 18 for gripping and maintaining the connectors already crimped.

The press 16 is a press for injecting a plastics material, the injection mold 19 of which is maintained at a suitable temperature for making as easy as possible an injection operation, said temperature being maintained as constant as possible by a circuit through which flows water or another fluid.

The press 17 is a shaping and refrigeration press the tool 20 of which is cooled, this tool 20 having exactly the shape of the injection mold 19.

The conveyor 14 carries mandrel supports 21. Inside each support extends a core 22 which is to be inserted into the channel 3 of the connector so as to avoid penetration of the thermoplastic material inside said channel. The shape of the core 22 varies of course with the shape and nature of the connector and whether the connector is of a male or a female connector. This core can slide inside its support under the effect of a jack 23 pushing or pulling it.

The hereabove described device operates in the following manner:

The conductors 5 and its insulating sleeve 6 provided with the connector are fed by the first conveyor 7 which is part of the crimping machine, or which is an intermediate transfer conveyor, between the crimping machine and the machine of the invention, to a station A, while the gripping tool 18 of the press 15, the mold 19 of the press 16 and the tool 20 of the press 17 are opened.

When conveyor 7 is stopped at the station A, the tool 18, the mold 19 and the refrigeration tool 20 close. The closing of the tool 18 has for its effect to grip and keep the connector stationary and, at this moment, the core 22 which is opposite the station A is pushed inside the connector by the jack 23. The tool and mold are then opened and conveyors 7 and 14 move the wire and connector which were at the station A to a station B, with the core 22 being still engaged in the connector. At the station B, the press 16 closes its mold and injects the plastics material which is over-molded on the connector and a portion of its sleeve 6, the core 22 protecting the portion of the connector intended for later-on providing an electrical connection.

As soon as the injection is completed, the mold 19 is opened while the injected material is still hot and not yet solidified. The conveyors move then along a new step p, bringing the connector, on which the plastics material has just been molded, between the refrigerated tools 20 of the press 17 at a station C. The transfer of the over-molded connector from the first mold to the second mold is quick enough for preventing a deformation of the material which is still not solidified. Closing of the tools 20 possibly brings back to shape the over molding material and causes its rapid cooling since the refrigerated tools 20 are at a temperature much lower than the temperature to which it would be normally possible to inject the material, thereby providing a quick cooling while at the same time bringing back to shape the over-molded material, somehow as a shaping operation under pressure. An over-molding of a very good quality is thus obtained and at the same time a very quick cooling.

Although not shown, it is obvious that the various tools and molds are provided with detectors for preventing their closing if an accident of some sort happens. Particularly, there is provided a detector for detecting presence of a connector at the press 15. Another detector is also provided at the injection press 16, and also possibly at the press 17.

At the station C, a clamp 24 of a jack 23 is provided for bringing backwards the core 22 which was engaged inside the connector. This operation is carried out just before opening of the refrigerated tools. During the next forward move, it is the first conveyor 7 which carries the conductor provided with an over-molded connector beyond the conveyor 14 to the discharge station of the conductors.

As shown in FIG. 3, the conveyor 14 is in the form of an endless conveyor comprising a set of mandrels 21 and means for their support and guiding, the various mandrels 21 being separated by a distance corresponding to the step p.

At the various working stations described, the support means for the rods 21 are maintained in guides 25.

The invention is not limited to the embodiments shown and described in detail and several modifications may be carried out without departing from its scope as shown in the appendent claims.

I claim:

1. A process for over-molding connectors with a thermoplastic material, said connectors being previously positioned on tip ends of electrical conductors, wherein said over-molding is carried out in an injection press having a first injection mold into which is introduced the connector affixed to its conductor to produce an over-molded connector by injection molding, wherein the over-molded connector is extracted from the first cavity mold at a temperature at which the thermoplastic material is still hot and wherein the over-molded connector is transferred into a second mold of a second press which is of exactly the shape of the injection mold, said second mold being maintained at a temperature lower than that of the first injection mold of the injection press and less than that at which it would be possible to make an injection molding of the thermoplastic material, the transferring of the over-molded connector from the first injection mold of the injection press to the second mold of the second press being sufficiently rapid to prevent a substantial deformation of the thermoplastic material which is still not solidified, the thermoplastic material being then re-molded in the mold of the second press.

2. A process according to claim 1, wherein the step of carrying the connectors to the injection press is provided directly at the discharge end of a machine crimping the connectors on the stripped end of the conductors.

3. A process as set forth in claim 1 wherein the second mold of the second press is refrigerated when the over-molded connector is transferred thereto from the first injection mold of the injection press.

4. A machine for the over-molding of a thermoplastic material on connectors crimped on the stripped end of conductors in a crimping machine, said overmolding machine comprising a conveyor extending from the crimping machine, which conveyor carries the connectors to a first station, mean at the first station to position a core at portions of the connector which have to be protected from over-molding and then carries the connectors to a second station, said second station comprising an injection press having a first injection mold into which the connector affixed to its conductor and associated with a core is introduced, the injection press being maintained at a suitably high temperature to enable introduction therein of an over-molding thermoplastic material to produce an over-molded connector by injection molding, said first injection mold opening while the injected material still is hot and not yet solidified, and said over-molded connector being extracted from the opened first injection mold and transferred to a third station comprising a press including a second mold which is of exactly the shape of the injection mold, said second mold being maintained at a temperature lower than that of the first injection mold of the injection press and less than that at which it would be possible to make an injection molding of the thermoplatic material, the transferring of the over-molded connector from the first injection mold of the injection press to the second mold of the second press being sufficiently rapid to prevent a substantial deformation of the thermoplastic material which is still not solidified, the thermoplastic material then being re-molded in the mold of the second press.

5. A machine as set forth in claim 4 wherein means is included to refrigerate the molding tools at the third station.

6. A machine according to claim 4, wherein said presses are placed between two conveyors, one of which extending from the crimping machine and the other one being provided with guiding supports for the cores introduced at the portions of the connectors to be protected.

7. A machine according to claim 6, wherein the conveyor carrying the cores is an endless conveyor whose supports for the cores are spaced apart by a distance equal to advancement step of said conveyors, said step corresponding to distance between the working stations.

8. A machine according to claim 6, wherein the conveyor bringing the conductors on which are crimped the connectors is a discharge conveyor of the crimping machine for the connectors.

9. A machine according to claim 6, comprising synchronizing means established between the conveyor bringing the conductors provided with their connector and the conveyor carrying the mandrels and the cores.

* * * * *